United States Patent
He (10) Patent No.: US 10,262,180 B2
(45) Date of Patent: Apr. 16, 2019

(54) FINGERPRINT IDENTIFICATION CIRCUIT, DRIVING METHOD THEREOF, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Xiaoxiang He, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 80 days.

(21) Appl. No.: 15/690,033

(22) Filed: Aug. 29, 2017

(65) Prior Publication Data
US 2018/0189538 A1 Jul. 5, 2018

(30) Foreign Application Priority Data
Jan. 4, 2017 (CN) .......................... 2017 1 0005121

(51) Int. Cl.
*G06K 9/00* (2006.01)
(52) U.S. Cl.
CPC ....... *G06K 9/0002* (2013.01); *G06K 9/00067* (2013.01)
(58) Field of Classification Search
CPC .................................... G06K 9/0002
See application file for complete search history.

(56) References Cited

U.S. PATENT DOCUMENTS

| 10,021,335 B2 * | 7/2018 | Niwa | H01L 27/14612 |
| 2002/0012057 A1 * | 1/2002 | Kimura | H04N 5/35536 348/308 |
| 2006/0158202 A1 * | 7/2006 | Umeda | G06K 9/0002 324/686 |

(Continued)

FOREIGN PATENT DOCUMENTS

| CN | 104077565 A | 10/2014 |
| CN | 104112120 A | 10/2014 |

(Continued)

*Primary Examiner* — Utpal D Shah
(74) *Attorney, Agent, or Firm* — Brooks Kushman P.C.

(57) ABSTRACT

A fingerprint identification circuit includes a plurality of fingerprint identification units arranged in an array form. Each fingerprint identification unit includes: an input module configured to apply a detection signal to a sensing module; the sensing module configured to sense a fingerprint and transmit a sensing signal to a source follower; the source follower configured to amplify the sensing signal and output it to an output module; an output control module configured to apply an operating voltage for the source follower to the source follower; the output module configured to output the amplified sensing signal; a resetting module configured to reset an output end of the source follower and an input end of the output module to be at a first level; and an acquisition module configured to enable the input end and an operating voltage input end of the source follower to be electrically connected to each other.

18 Claims, 4 Drawing Sheets

(56) References Cited

U.S. PATENT DOCUMENTS

| | | | |
|---|---|---|---|
| 2008/0180555 A1* | 7/2008 | Sato | H04N 5/3452 348/248 |
| 2016/0006969 A1* | 1/2016 | Matsumoto | H04N 5/357 348/308 |
| 2016/0042216 A1 | 2/2016 | Yang et al. | |
| 2016/0050378 A1* | 2/2016 | Wu | H04N 5/3696 348/77 |
| 2016/0170046 A1* | 6/2016 | Kimura | H04N 3/155 378/64 |
| 2016/0253541 A1 | 9/2016 | Yang et al. | |
| 2016/0275331 A1* | 9/2016 | Cheng | G01N 27/228 |
| 2017/0286747 A1* | 10/2017 | Kim | G06K 9/00087 |
| 2018/0089488 A1* | 3/2018 | Chao | G06F 3/041 |

FOREIGN PATENT DOCUMENTS

| | | |
|---|---|---|
| CN | 104155785 A | 11/2014 |
| CN | 104282265 A | 1/2015 |

\* cited by examiner

FINGERPRINT IDENTIFICATION CIRCUIT, DRIVING METHOD THEREOF, AND DISPLAY DEVICE

CROSS-REFERENCE TO RELATED APPLICATION

The present application claims priority to Chinese patent application No. 201710005121.9 filed on Jan. 4, 2017, which is incorporated herein by reference in its entirety.

TECHNICAL FIELD

The present disclosure relates to the field of display technology, in particular to a fingerprint identification circuit, a driving method thereof, and a display device.

BACKGROUND

Everyone's fingerprint is unique, and based on this feature, it is able to facilitate the operation and improve the security when an electronic device (e.g., a mobile phone) includes a fingerprint identification function.

However, a conventional fingerprint identification circuit has low fingerprint identification accuracy.

SUMMARY

An object of the present disclosure is to provide a fingerprint identification circuit, a driving method thereof, and a display device, so as to improve the fingerprint identification accuracy.

In one aspect, the present disclosure provides in some embodiments a fingerprint identification circuit, including a plurality of fingerprint identification units arranged in an array form. Each fingerprint identification unit includes an input module, a sensing module, a source follower, an acquisition module, a resetting module, an output control module and an output module. The input module is connected to the sensing module and configured to be turned on when a first control signal is valid and output a detection signal to the sensing module. The sensing module is configured to sense a fingerprint and transmit a sensing signal to the source follower. An input end of the source follower is connected to the sensing module, an operating voltage input end thereof is connected to the output control module, and an output end thereof is connected to the output module. The source follower is configured to, when the output control module is turned on, amplify the sensing signal and output the amplified sensing signal to the output module. The output control module is configured to be turned on when a third control signal is valid and apply an operating voltage desired for the source follower to the source follower. The output module is configured to be turned on when the third control signal is valid and output the amplified sensing signal. The resetting module is connected to the output end of the source follower and an input end of the output module, and configured to be turned on in the case that a second control signal is valid and reset the output end of the source follower and the input end of the output module to be at a first level. The acquisition module is connected to the input end and the operating voltage input end of the source follower, and configured to be turned on when the second control signal is valid and enable the input end of the source follower to be electrically connected to the operating voltage input end of the source follower. The first control signal is a valid signal inputted at a first time period, the second control signal is a valid signal inputted at a second time period subsequent to the first time period, and the third control signal is a valid signal inputted at a third time period subsequent to the second time period.

In a possible embodiment of the present disclosure, an identical first control signal, an identical second control signal and an identical third control signal are adopted by the fingerprint identification units in an identical row.

In a possible embodiment of the present disclosure, a control end of the input module of each fingerprint identification unit in an $n^{th}$ row is connected to a control end of the output module of each fingerprint identification unit in an $(n-3)^{th}$ row, and a control end of the acquisition module and a control end of the resetting module of each fingerprint identification unit in the $n^{th}$ row are connected to a control end of the output module of each fingerprint identification unit in an $(n-2)^{th}$ row.

In a possible embodiment of the present disclosure, the input module includes a first transistor, a gate electrode of which, as the control end of the input module, is configured to receive the first control signal, a first electrode of which, as the input end of the input module, is configured to receive the detection signal, and a second electrode of which, as an output end of the input module, is connected to the sensing module.

In a possible embodiment of the present disclosure, the sensing module includes a first electrode and a second electrode arranged opposite to the first electrode. The first electrode is connected to the input module and the source follower. The second electrode is connected to a control signal end and configured to adjust a potential at the input end of the source follower under the control of a control signal from the control signal end, so as to enable the source follower to operate at a saturation region and adjust an intensity of an output signal from the source follower.

In a possible embodiment of the present disclosure, the acquisition module includes a second transistor, a gate electrode of which, as the control end of the acquisition module, is configured to receive the second control signal, a first electrode of which is connected to the input end of the source follower, and a second electrode of which is connected to the operating voltage input end of the source follower.

In a possible embodiment of the present disclosure, the resetting module includes a third transistor, a gate electrode of which, as the control end of the resetting module, is configured to receive the second control signal, a first electrode of which, as an input end of the resetting module, is connected to a first level signal end, and a second electrode of which, as an output end of the resetting module, is connected to the output end of the source follower.

In a possible embodiment of the present disclosure, the source follower includes a fourth transistor, a gate electrode of which, as the input end of the source follower, is connected to the sensing module, a first electrode of which, as the operating voltage input end of the source follower, is connected to the output control module, and a second electrode of which, as the output end of the source follower, is connected to the output module.

In a possible embodiment of the present disclosure, the output control module includes a fifth transistor, a gate electrode of which, as a control end of the output control module, is configured to receive the third control signal, a first electrode of which, as an input end of the output control module, is configured to receive a first signal, and a second electrode of which, as an output end of the output control module, is connected to the operating voltage input end of the source follower.

In a possible embodiment of the present disclosure, the output module includes a sixth transistor, a gate electrode of which, as the control end of the output module, is configured to receive the third control signal, a first electrode of which, as the input end of the output module, is connected to the output end of the source follower, and a second electrode of which serves as an output end of the output module.

In a possible embodiment of the present disclosure, the detection signal is a power source voltage, the operating voltage for the source follower is also the power source voltage, the first level is a ground level, and the third control signal is a row scanning signal corresponding to a row where the fingerprint identification unit is located.

In another aspect, the present disclosure provides in some embodiments a display device including the above-mentioned fingerprint identification circuit.

In a possible embodiment of the present disclosure, the fingerprint identification circuit is arranged on an upper glass substrate of the display device.

In a possible embodiment of the present disclosure, a fingerprint identification unit of the fingerprint identification circuit is built in the pixel of the display device.

In a possible embodiment of the present disclosure, each pixel of display device includes a driving transistor configured to control the application of a display signal for the pixel, and the transistors of the fingerprint identification circuit are manufactured synchronously with the driving transistor.

In yet another aspect, the present disclosure provides in some embodiments a method for driving the above-mentioned fingerprint identification circuit, including steps of: turning on the input module of the fingerprint identification unit, so as to apply a detection signal to the sensing module of the fingerprint identification unit; after the application of the detection signal to the sensing module, turning off the input module; turning on the resetting module and the acquisition module of the fingerprint identification unit, so as to reset an output end of the source follower of the fingerprint identification unit to be at a first level, and enable an input end of the source follower to be electrically connected to an operating voltage input end of the source follower; turning off the resetting module and the acquisition module, and sensing, by the sensing module, a fingerprint and transmitting a sensing signal to the source follower; and turning on the output control module and the output module of the fingerprint identification unit, so as to enable the source follower to amplify the sensing signal and output the amplified sensing signal to the output module, and enable the output module to output the amplified sensing signal.

In a possible embodiment of the present disclosure, subsequent to the step of turning off the resetting module and the acquisition module and prior to or subsequent to the step of turning on the output control module and the output module, the method further includes adjusting a potential at the input end of the source follower under the control of a control signal from a second electrode of the sensing module, so as to enable the source follower to operate at a saturation region and adjust an intensity of an output signal from the source follower.

According to the fingerprint identification circuit, the manufacturing method thereof and the display device in the embodiments of the present disclosure, for each fingerprint identification unit of the fingerprint identification circuit, the source follower is arranged between the output module and the sensing module, so as to amplify the sensing signal acquired by the sensing module for a predetermined time. Then, the amplified sensing signal is output through the output module. As a result, it is able to increase an identification degree of the signal, thereby to improve the fingerprint identification accuracy.

In addition, the first control signal is a valid signal at the first time period, so as to turn on the input module and input the detection signal to the sensing module. The second control signal is a valid signal at the second time period after the first time period, so as to turn on the resetting module and the acquisition module. The resetting module may reset the output end of the source follower and the input end of the output module to the first level (e.g., the ground level), and the acquisition module may enable the input end and the operating voltage input end of the source follower to be electrically connected to each other, so that the potential at the input end of the source follower is a sum of the first level and a threshold voltage of the source follower. The third control signal is a valid signal at the third time period after the second time period, so as to turn on the output control module and the output module. The source follower may amplify the sensing signal from the sensing module and output the amplified sensing signal through the output module. Due to the acquisition module, the potential at the input end of the source follower has contained information about the threshold voltage of the source follower, so the output signal is irrelevant to the threshold voltage of the source follower, i.e., an offset caused due to the threshold voltage of the source follower has been cancelled out from the output signal. As a result, it is able to further improve the fingerprint identification accuracy.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
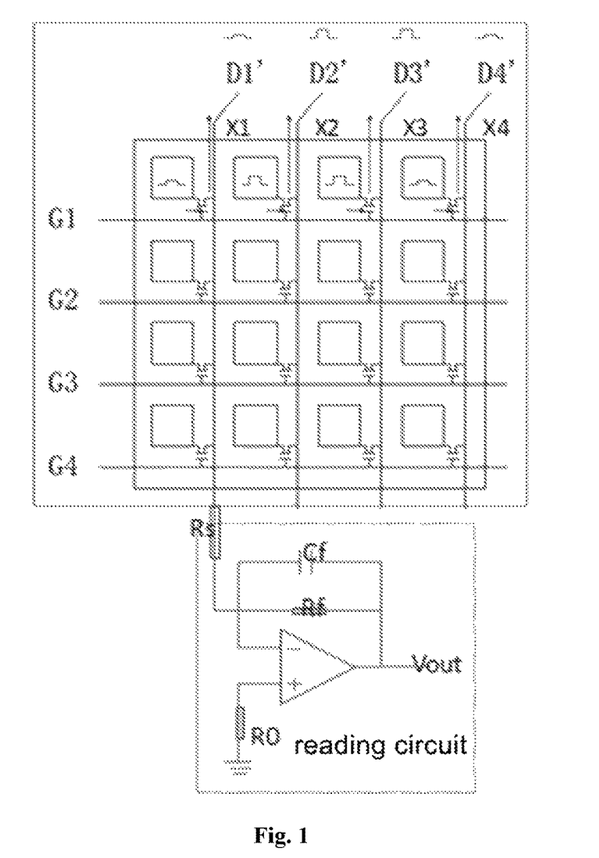
FIG. 1 is a circuit diagram of a conventional fingerprint identification circuit.

As shown in FIG. 1, a fingerprint identification circuit usually includes array sensing electrodes with the electrodes in rows crossing the electrodes in columns, row-driving lines G1 to Gn, column signal lines X1-Xn, and thin film transistors (TFTs). An operation procedure of the fingerprint identification circuit will be described as follows.

Writing of detection signal: a voltage is applied to the row-driving line G1 so as to turn on the TFTs in a first row, and the detection signal is written through the column signal lines X1 to Xn. Due to a capacitance coupling effect, a capacitance is generated at a region where the sensing electrode is located.

Changing of potential signal on sensing electrode by finger touch: in the case of no change from the outside, the capacitance may not change. A fingerprint includes peaks and valleys, and a distance between the peak and the sensing electrode is different from a distance between the valley and the sensing electrode. When a touch operation is made by a finger, the capacitances of the fingerprint sensing electrodes corresponding to the peaks and the valleys may change differently, and each capacitance variation may uniquely correspond to a specific position in a two-dimensional dot matrix.

Reading of fingerprint detection signal: after the capacitance change, a signal on each fingerprint detection electrode is read by the column signal line, and transmitted to a corresponding signal reception and processing unit.

Comparison and processing: each signal reception and processing unit compares an original input signal (a detection signal before the touch operation) with the signal read by the column signal line, so as to determine a peak or valley corresponding to the signal reception and processing unit in accordance with a difference therebetween.

The row-driving lines in the remaining rows may be scanned sequentially, and the above steps may be repeated, until all the row-driving lines have been scanned.

Figure 2:
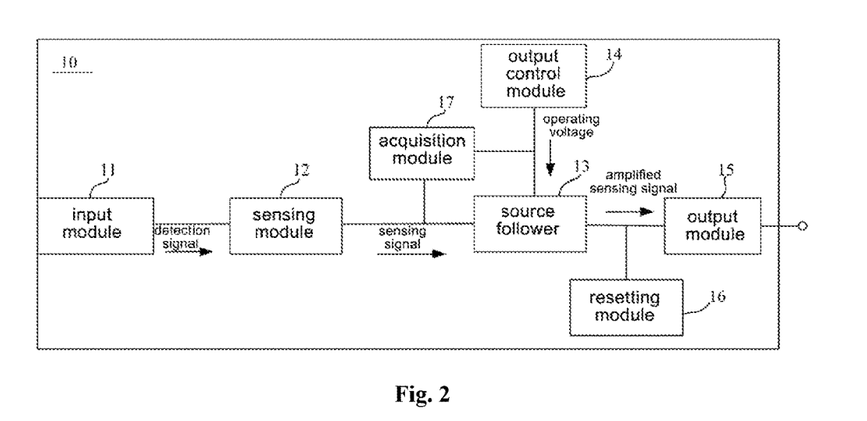
FIG. 2 is a block diagram of a fingerprint identification unit according to at least one embodiment of the present disclosure.

The present disclosure provides in some embodiments a fingerprint identification circuit which includes a plurality of fingerprint identification units 10 arranged in an array form. As shown in FIG. 2, each fingerprint identification unit 10 includes an input module 11, a sensing module 12, a source follower 13, an acquisition module 17, a resetting module 16, an output control module 14 and an output module 15. The input module 11 is connected to the sensing module 12 and configured to be turned on when a first control signal is valid and output a detection signal to the sensing module 12. The sensing module 12 is configured to sense a fingerprint and transmit a sensing signal to the source follower 13. An input end of the source follower 13 is connected to the sensing module 12, an operating voltage input end thereof is connected to the output control module 14, and an output end thereof is connected to the output module 15. The source follower 13 is configured to, in the case that the output control module 14 is turned on, amplify the sensing signal and output the amplified sensing signal to the output module 15. The output control module 14 is configured to be turned on in the case that a third control signal is valid and apply an operating voltage of the source follower 13 to the source follower 13. The output module 15 is configured to be turned on in the case that the third control signal is valid and output the amplified sensing signal. The resetting module 16 is connected to the output end of the source follower 13 and an input end of the output module 15, and configured to be turned on in the case that a second control signal is valid and reset the output end of the source follower 13 and the input end of the output module 15 to be at a first level. The acquisition module 17 is connected to the input end and the operating voltage input end of the source follower 13, and configured to be turned on in the case that the second control signal is valid and enable the input end of the source follower 13 to be electrically connected to the operating voltage input end of the source follower 13. The first control signal is a valid signal inputted at a first time period, the second control signal is a valid signal inputted at a second time period subsequent to the first time period, and the third control signal is a valid signal inputted at a third time period subsequent to the second time period.

According to the embodiments of the present disclosure, the fingerprint identification circuit includes the plurality of fingerprint identification units 10 arranged in an array form, and these fingerprint identification units 10 work together to identify a fingerprint. The input module 11 is turned on so as to input the detection signal for the detection of the fingerprint to the sensing module 12, the sensing module 12 detects the fingerprint and transmits the acquired sensing signal (including fingerprint information) to the source follower 13, and then the source follower 13 amplifies the sensing signal. As a result, it is able to increase an identification degree of the signal, thereby to improve the fingerprint identification accuracy.

The signal amplified and output by the source follower 13 may include information about a threshold voltage of the source follower 13. Due to a manufacture process or the like, an offset may occur for the threshold voltage, so an offset may also occur for the output signal. In a possible embodiment of the present disclosure, before the source follower 13 amplifies the sensing signal and outputs the amplified sensing signal, the threshold voltage of the source follower 13 may be acquired, so that the signal, which is inputted to the source follower 13 but has not been amplified yet, has already contained the information about the threshold voltage of the source follower 13. To be specific, the output control module 14 may be added at the operating voltage input end of the source follower 13, so as to control a time point when the operating voltage is applied to the source follower 13. Through the output control module 13 in conjunction with the other modules (the acquisition module 17 and the output module 15), it is able to control the source follower 13 to be at a stage where the sensing signal is to be amplified or at a stage where its threshold voltage is to be acquired. The resetting module 16 may be arranged at the output end of the source follower 13, and through the second control signal, it is able to control a time point when the output end of the source follower 13 is to be reset to the (known) first level. The acquisition module may be arranged at the input end (to which the to-be-amplified sensing signal is applied) and the operating voltage input end of the source follower 13. At an acquisition stage, the output control module 14 may be turned off, and meanwhile the resetting module 16 and the acquisition module 17 may be turned on under the control of the second control signal. The output end of the source follower 13 may be reset to the first level, and the input end and the operating voltage input end of the source follower 13 may be electrically connected to each other through the acquisition module 17. At this time, a potential at the input end of the source follower 13 is a sum of a potential at the output end of the source follower 13 and the threshold voltage of the source follower 13. The potential at the output end of the source follower 13 is equal to the first level, so the potential at the input end of the source follower 13 may be a sum of the first level and the threshold voltage of the source follower 13.

Based on the above, in the case that the third control signal is valid, the output control module 14 and the output module 15 may be turned on, and the source follower 13 may amplify the sensing signal applied to its input end (from the sensing module 12) and output the amplified sensing signal through the output module 15. Due to the effect of the acquisition module, the potential at the input end of the source follower has already contained the information about the threshold voltage of the source follower, so at this time, the output signal is irrelevant to the threshold voltage of the source follower, i.e., an offset caused by the threshold voltage of the source follower has been cancelled out from the output signal. As a result, it is able to further improve the fingerprint identification accuracy.

In a possible embodiment of the present disclosure, an identical first control signal may be adopted by the input modules 11 of the fingerprint identification units 10 in an identical row, an identical second control signal may be adopted by the resetting modules 16 and the acquisition modules 17 of the fingerprint identification units 10 in an identical row, and an identical third control signal may be adopted by the output control modules 14 and the output modules 15 of the fingerprint identification units 10 in an identical row. In other words, the fingerprint identification units in an identical row may be controlled by an identical signal, so as to ensure the synchronization during the operation.

In a possible embodiment of the present disclosure, operating stages of the fingerprint identification units in different rows may overlap each other, so as to reduce the time to progressively scan these fingerprint identification units. For example, a control end of the input module 11 of each fingerprint identification unit in an $n^{th}$ row may be connected to a control end of the output module 15 of each fingerprint identification unit in an $(n-3)^{th}$ row, or these input modules 11 and these output modules 15 may adopt an identical control signal. In this way, the input modules 11 of the fingerprint identification unit in the $n^{th}$ row may be turned on and output the detection signal to the sensing modules 12 of the fingerprint identification units in the $n^{th}$ row while the output modules 15 of the fingerprint identification units in the $(n-3)^{th}$ row are turned on and output the signal, so as to prepare for the sensing of the fingerprint through the sensing modules 12 in the $n^{th}$ row. In addition, a control end of the acquisition module 17 and a control end of the resetting module 16 of each fingerprint identification unit in the $n^{th}$ row may be connected to a control end of the output module 15 of each fingerprint identification unit in an $(n-2)^{th}$ row, or they may adopt an identical control signal. In this way, the acquisition modules 17 and the resetting modules 16 of the fingerprint identification units in the $n^{th}$ row may be turned on while the output modules 15 of the fingerprint identification units in the $(n-2)^{th}$ row are turned on to output the signal, so as to acquire the information about the threshold voltages of the source followers of the fingerprint identification units in the $n^{th}$ row, thereby to prepare for the signal output through the fingerprint identification units in the $n^{th}$ row, where n is a natural number greater than 3.

Similarly, in the case that the fingerprint identification units in the $n^{th}$ row output the signal, the fingerprint identification units in an $(n+1)^{th}$ row may acquire the information about the threshold voltages of the source followers 13, and the fingerprint identification units in an $(n+2)^{th}$ row may input the detection signal; in the case that the fingerprint identification units in the $(n+1)^{th}$ row output the signal, the fingerprint identification units in the $(n+2)^{th}$ row may acquire the information about the threshold voltages of the source followers 13, and the fingerprint identification units in an $(n+3)^{th}$ row may input the detection signal; in the case that the fingerprint identification units in the $(n+2)^{th}$ row output the signal, the fingerprint identification units in the $(n+3)^{th}$ row may acquire the information about the threshold voltages of the source followers 13, and the fingerprint identification unit in an $(n+4)^{th}$ row may output the detection signal, and so on. In this way, it is able to reduce the time for the scanning operation and increase a scanning frequency, thereby to increase a response speed.

The implementations of the respective modules will not be particularly defined herein, and any known implementations thereof may be adopted. For ease of understanding, the fingerprint identification circuit in the embodiments of the present disclosure will be described hereinafter in more details.

Figure 3:
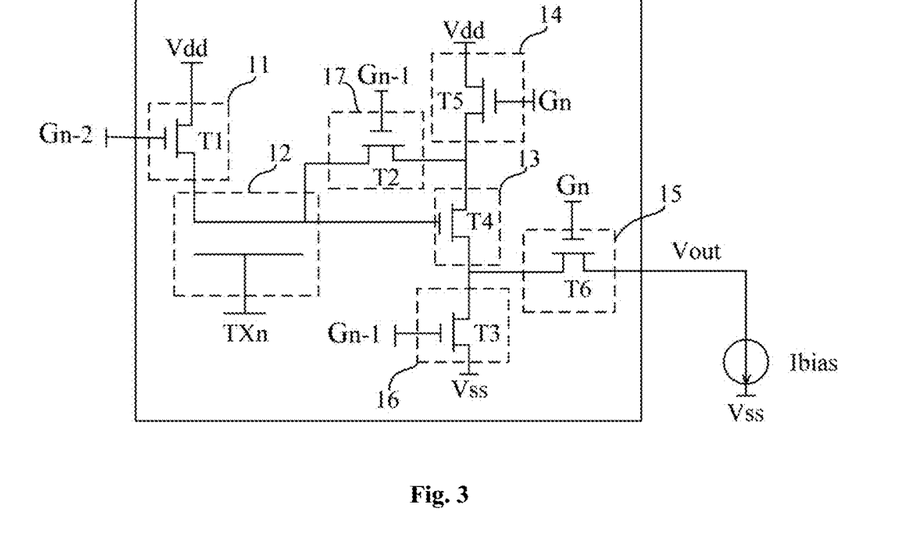
FIG. 3 is a circuit diagram of the fingerprint identification unit according to at least one embodiment of the present disclosure.

As shown in FIG. 3, the input module 11 may include a first transistor T1, a gate electrode of which, as the control end of the input module 11, is configured to receive the first control signal (e.g., a row scanning signal Gn-2), a first electrode of which, as the input end of the input module 11, is configured to receive the detection signal (e.g., Vdd), and a second electrode of which, as an output end of the input module 11, is connected to the sensing module 12. The sensing module 12 may include a first electrode and a second electrode arranged opposite to the first electrode. The first electrode is connected to the input module 11 and the source follower 13. The second electrode is connected to a control signal end TXn and configured to adjust a potential at the input end of the source follower 13 under the control of a control signal from the control signal end, so as to enable the source follower 13 to operate at a saturation region and adjust an output signal from the source follower 13 (i.e., adjust a signal quantity of the source follower 13). The source follower 13 may include a fourth transistor T4, a gate electrode of which, as the input end of the source follower 13, is connected to the sensing module 12, a first electrode of which, as the operating voltage input end of the source follower 13, is connected to the output control module 14, and a second electrode of which, as the output end of the source follower 13, is connected to the output module 15. The output control module 14 may include a fifth transistor T5, a gate electrode of which, as a control end of the output control module 14, is configured to receive the third control signal, a first electrode of which, as an input end of the output control module 14, is configured to receive a first signal (e.g., Vdd), and a second electrode of which, as an output end of the output control module 14, is connected to the operating voltage input end of the source follower 13. The output module 15 may include a sixth transistor T6, a gate electrode of which, as the control end of the output module 15, is configured to receive the third control signal, a first electrode of which, as the input end of the output module 15, is connected to the output end of the source follower 13, and a second electrode of which serves as an output end of the output module 15. The resetting module 16 may include a third transistor T3, a gate electrode of which, as the control end of the resetting module 16, is configured to receive the second control signal, a first electrode of which, as an input end of the resetting module 16, is connected to a first level signal end, and a second electrode of which, as an output end of the resetting module 16, is connected to the output end of the source follower 13. The acquisition module 17 may include a second transistor T2, a gate electrode of which, as the control end of the acquisition module 17, is configured to receive the second control signal (e.g., the row scanning signal Gn-1), a first electrode of which is connected to the input end of the source follower 13, and a second electrode of which is connected to the operating voltage input end of the source follower 13.

In a possible embodiment of the present disclosure, the detection signal may a power source voltage signal Vdd which may also be applied to the operating voltage input end of the source follower 13, and the first level may be a ground level, i.e., it may be a Vss signal applied to the first electrode of the third transistor T3 of the resetting module 16. The third control signal may be a row scanning signal corresponding to the row where the fingerprint identification units are located (which is similar to a gate scanning signal for liquid crystal display), and the first and second control signals may be a scanning signal for the fingerprint identification units in a certain row prior to the current row. For example, for the fingerprint identification units in the $n^{th}$ row, the first control signal may be the row scanning signal for the fingerprint identification units in the $(n-2)^{th}$ row, the second control signal may be the row scanning signal for the fingerprint identification units in the $(n-1)^{th}$ row, and the third control signal may be the row scanning signal for the fingerprint identification units in the $n^{th}$ row.

The present disclosure further provides in some embodiments a method for driving the above-mentioned fingerprint identification circuit which, as shown in FIGS. 4 to 7, may include the following steps.

Figure 4:
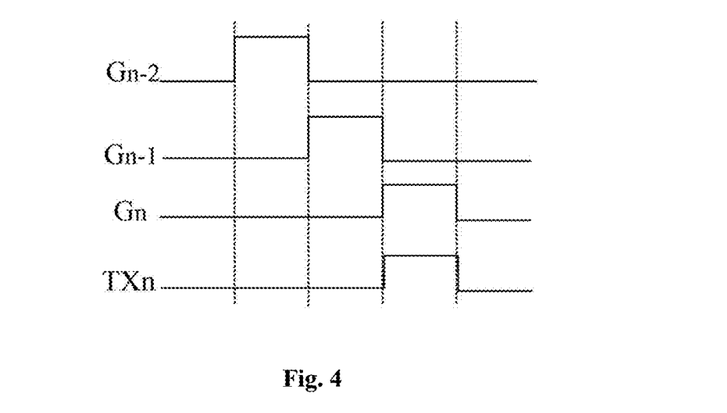
FIG. 4 is a driving time sequence diagram of the fingerprint identification unit in FIG. 3.
Figure 5:
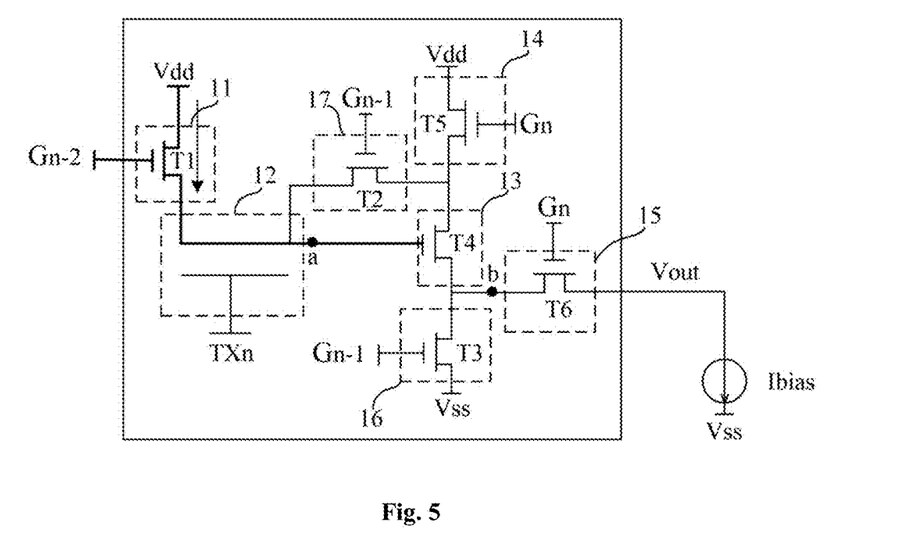
FIG. 5 is a schematic view showing an operating state of the fingerprint identification unit in FIG. 3.

Step 1: turning on the input module 11 of the fingerprint identification unit 10, so as to apply a detection signal to the sensing module 12 of the fingerprint identification unit.

By taking the driving sequence in FIG. 4 and the circuit in FIG. 3 as an example, for the fingerprint identification units in the $n^{th}$ row, in Step 1, Va may be set to be equal to Vdd at a preset position of a reading point, as shown in FIG. 5. To be specific, a row scanning signal Gn-2 may be at a high level, so as to turn on the first transistor T1 which is the input module 11, and the signal Vdd (i.e., the detection signal) may then be applied to the sensing module 12 (e.g., a capacitor). At this time, a potential Va at point a may be equal to Vdd.

Figure 6:
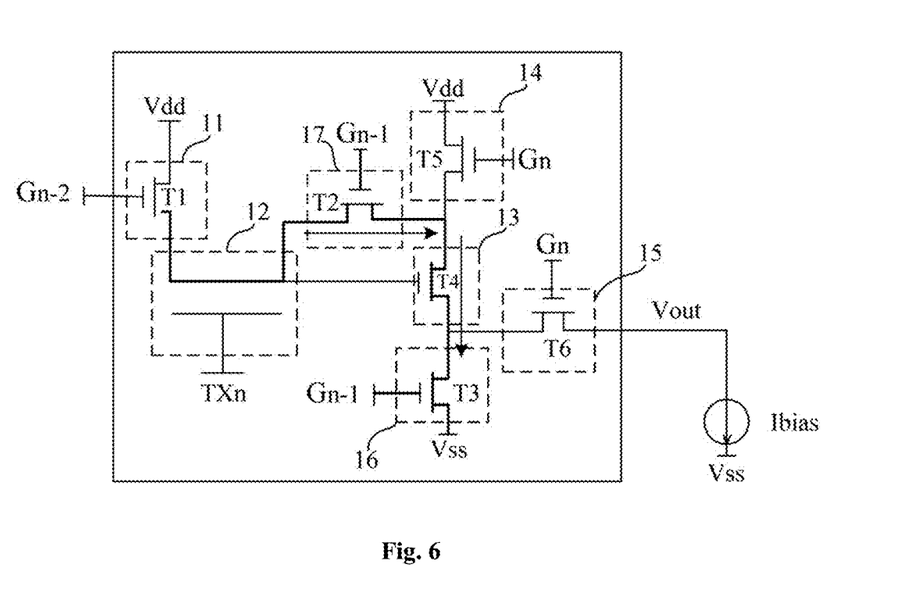
FIG. 6 is another schematic view showing the operating state of the fingerprint identification unit in FIG. 3.

Step 2: after the application of the detection signal to the sensing module 12, turning off the input module 11, and turning on the resetting module 16 and the acquisition module 17 of the fingerprint identification unit, so as to reset an output end of the source follower 13 of the fingerprint identification unit to be at a first level, and enable an input end of the source follower 13 to be electrically connected to an operating voltage input end of the source follower 13.

In this step, the threshold voltage Vth of the fourth transistor T4 (the source follower) may be acquired. As shown in FIG. 6, the row scanning signal Gn-2 may be at a low level, so as to turn off the first transistor T1. The row scanning signal Gn-1 corresponding to the fingerprint identification units in the $(n-1)^{th}$ row may be at a high level, so as to turn on the second transistor T2 and the third transistor T3. In the case that the second transistor T2 is turned on, the signal Vss may be applied to the output end of the source follower, and at this time, it may be considered that the potential at the output end of the source follower has been reset to 0, i.e., Vb=0. Because the second transistor T2 is in an on state, the input end and the operating voltage input end of the source follower may be electrically connected to each other (at this time, a row scanning signal Gn is at a low level, so the fifth transistor T5 is turned off). Arrows in FIG. 6 show the current direction. At this time, the potential Va at point a is equal to Vss+Vth, i.e., the threshold voltage Vth of the fourth transistor T4 has been acquired.

Figure 7:
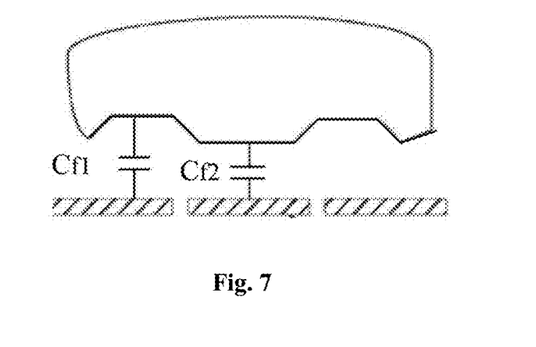
FIG. 7 is a schematic view showing a principle of a sensing module of the fingerprint identification unit in FIG. 3.

Step 3: turning off the resetting module 16 and the acquisition module 17, and sensing, by the sensing module 12, a fingerprint and transmitting a sensing signal to the source follower 13.

In Step 3, the sensing module 12 may sense the fingerprint and transmit the sensing signal to the source follower 13. As shown in FIG. 7, the fingerprint includes peaks and valleys, and a distance between the peak and the sensing electrode is different from a distance between the valley and the sensing electrode. In the case that a touch operation is made by the finger, the capacitances of the fingerprint sensing electrodes corresponding to the peaks and the valleys may change differently. For example, a capacitance Cf2 may be generated at the peak of the fingerprint, and a capacitance Cf1 may be generated at the valley. In other words, a touch or approaching operation of the finger may change a mutual capacitance between one electrode and another electrode (which is connected to a node a), resulting in two different voltages. In the case that there is a voltage change f(Va1) at the peak and a voltage change f(Va2) at the valley, f(Va1) is greater than f(Va2). Txn is an adjustment pulse signal for adjust the intensity of the output signal. In the case that Txn is a direct current (DC) signal, at the node a, Va1=Vss+Vth+f(Va1) during the sensing of the peak, and Va2=Vss+Vth+f(Va2) during the sensing of the valley.

Figure 8:
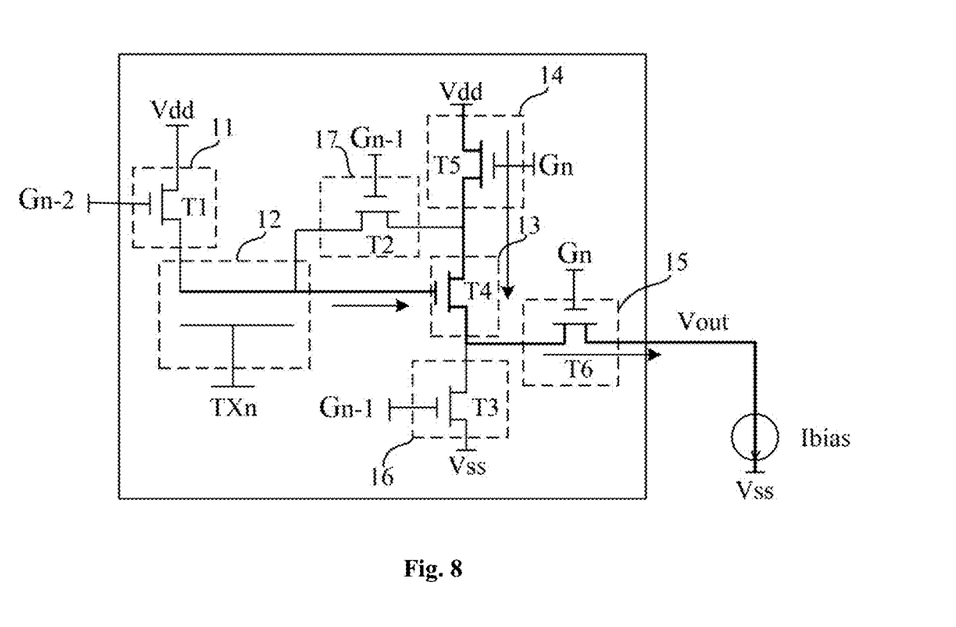
FIG. 8 is yet another schematic view showing the operating state of the fingerprint identification unit in FIG. 3.

Step 4: turning on the output control module 14 and the output module 15 of the fingerprint identification unit, so as to enable the source follower 13 to amplify the sensing signal and output the amplified sensing signal to the output module 15, and enable the output module 15 to output the amplified sensing signal.

Step 4 is a signal reading step. As shown in FIG. 8, in this step, the row scanning signal Gn-1 is at a low level, so as to turn off T2 and T3. In addition, the row scanning signal Gn is at a high level, so as to turn on T5 (i.e., the output control module 14) and T6 (i.e., the output module 15), thereby to enable the source follower 13 to amplify the signal.

T4 is the source follower 13 and may operate at the saturation region, i.e., a bias current may flow through T4. The bias current Ibias may be calculated using the following equation: Ibias=½K(Vgs−Vth)², i.e., Ibias=½K(Va−Vb−Vth)² or Ibias=½K(Va−Vout−Vth)². Ibias is a bias constant current and has a fixed value, so Va−Vout−Vth also has a fixed value and may be set as C. At this time, Vout=Va−Vth−C. However, this expression contains Vth which may be uneven (i.e., Vth may be of different values or may drift). Hence, in the case that Vth of the source follower is not distributed evenly due to various offsets, i.e., in the case that ΔVth occurs, Vout may also change due to ΔVth, and at this time, the output signal may change too.

However, due to the Vth acquisition stage, before the reading stage, the potential Va1 at the node a of the fingerprint identification unit at the peak may be set to f(Va1)+Vss+Vth, and the potential Va2 at the node a of the fingerprint identification unit at the valley may be set to f(Va1)+Vss−C. Because Vout=Va−Vth−C, at the reading stage, the voltage Vout1 at the peak may be equal to f(Va1)+Vss−C, and the voltage Vout2 at the valley may be equal to f(Va2)+Vss−C. In this way, it is able to remove the Vth offset for the source follower from the output voltage Vout.

Subsequent to the step of turning off the resetting module 16 and the acquisition module 17 and prior to or subsequent to the step of turning on the output control module 14 and the output module 15, the method further includes adjusting a potential at the input end of the source follower 13 under the control of a control signal from a second electrode of the sensing module, so as to enable the source follower 13 to operate at the saturation region and adjust an intensity of an output signal from the source follower 13.

Txn may be an adjustment pulse signal for adjusting an intensity of the signal applied to the gate electrode of T4, so as to enable T4 to operate at the saturation region. Of course, in the case that a sum of Vss+Vth and the signal generated after sensing the fingerprint is sufficient to enable T4 to operate at the saturation region, it is unnecessary to adjust the intensity of the signal applied to the gate electrode of T4 through Txn, and at this time, Txn may be a DC signal.

To be specific, Txn may be used to adjust a size of the potential Va at the node a, thereby to adjust the intensity of the output signal (i.e., the size of the output voltage Vout). In the case that the intensity of the original signal (i.e., the input signal) is small, the potential Va at the node a may be adjusted through Txn, and in the case that the intensity of the original signal is not small, it is unnecessary to perform the adjustment through Txn.

In the case that the intensity of the original signal (i.e., the input signal) is small, Vgs may be smaller than Vth, so the fourth transistor T4 cannot be turned on. In other words, in order to turn on T4, Vgs needs to be greater than Vth, and Vgd needs to be less than Vth, where Vgs represents a gate-to-source voltage of T4, and Vgd represents a gate-to-drain voltage of T4. It is very easy for Vgd to be smaller than Vth, because a potential Vd at a drain electrode is equal to Vdd. However, in the case that Vgs is smaller than Vth, it is still impossible to turn on T4.

In the case that Vgs>Vth and Vgd<Vth, T4 may operate at the saturation region, and at this time, Ibias may be used to fix the output signal from the source follower (i.e., Va−Vout−Vth may be a constant C). Hence, Va, and thereby the output voltage Vout, may change along with Txn.

Hence, the source follower may be biased through Txn and Ibias, so as to be operated at the saturation region. In this way, it is able to fix Vgs of the source follower through the Ibias. Txn mainly functions as to, on one hand, ensure the source follower to operate at the saturation region (in the case that the source follower has already operated at the saturation region, Txn is not required), and on the other hand, adjust the intensity of the signal after the source follower has operated at the saturation region and has been biased through Ibias (e.g., adjust a size of the output voltage Vout).

In order to acquire the fingerprint information subsequently, a comparison step needs to be performed. To be specific, the original input signal (the detection signal) may be compared with the output signal, so as to determine whether the fingerprint identification unit corresponds to the peak or the valley in accordance with a difference between the original input signal and the output signal. The other fingerprint identification units in an identical row may operate in an identical way, which will thus not be particularly defined herein.

The fingerprint identification units may be scanned progressively, and the above steps may be performed repeatedly by each fingerprint identification unit, until all the fingerprint identification units have been scanned. The fingerprint information may be acquired in accordance with the coordinates of each fingerprint identification unit as well as information about the peaks/valleys.

The present disclosure further provides in some embodiments a display device including the above-mentioned fingerprint identification circuit. According to the embodiments of the present disclosure, it is able to provide the display device with a fingerprint identification function, thereby to improve its security.

The fingerprint identification device may have a silicon wafer structure (i.e., an integrated circuit (IC) process), or it may be integrated into the display device through a TFT process (i.e., after the manufacture of the display device, the fingerprint identification circuit may be formed on an upper glass substrate). The display device may be any product or member having a display function, such as a liquid crystal panel, an electronic paper, an Organic Light-Emitting Diode (OLED) panel, a mobile phone, a flat-panel computer, a television, a display, a laptop computer, a digital photo frame or a navigator.

In a possible embodiment of the present disclosure, each fingerprint identification unit of the fingerprint identification circuit may be built in each pixel of the display devices, so as to provide a display panel with the fingerprint identification function, thereby to facilitate the operation and improve the security.

In a possible embodiment of the present disclosure, each pixel of display device may include a driving transistor configured to control the application of a display signal for the pixel, and the transistors of the fingerprint identification circuit may be manufactured synchronously with the driving transistor, so as not to increase the number of manufacture processes due to the additional fingerprint identification function.

In the embodiments of the present disclosure, the serial numbers of the steps shall not be used to define the order of the steps, and it should be appreciated that, a person skilled in the art may perform the steps in any other orders without any creative effort, which will also fall within the scope of the present disclosure.

For clarification, such words as "first" and "second" are used to illustratively differentiate the similar members, but they shall not be used to define the number of the members. It should be appreciated that, any obvious modifications or relevant expansion made in accordance with the description of the present disclosure shall also fall within the scope of the present disclosure.

It should be appreciated that, all or parts of the steps in the above-mentioned method may be implemented by relevant hardware through a computer program. The program may be stored in a computer-readable storage medium, and in the case that the program is being executed, it is able to perform the steps in the above-mentioned method. The storage medium may be a magnetic disk, an optical disk, a Read Only Memory (ROM) or a Random Access Memory (RAM).

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A fingerprint identification circuit, comprising a plurality of fingerprint identification units arranged in an array form, wherein each fingerprint identification unit comprises an input module, a sensing module, a source follower, an acquisition module, a resetting module, an output control module and an output module;

the input module is connected to the sensing module and configured to be turned on when a first control signal is valid and output a detection signal to the sensing module;

the sensing module is configured to sense a fingerprint and transmit a sensing signal to the source follower;

an input end of the source follower is connected to the sensing module, an operating voltage input end of the source follower is connected to the output control module, and an output end of the source follower is connected to the output module;

the source follower is configured to, when the output control module is turned on, amplify the sensing signal and output the amplified sensing signal to the output module;

the output control module is configured to be turned on when a third control signal is valid and apply an operating voltage of the source follower to the source follower;

the output module is configured to be turned on when the third control signal is valid and output the amplified sensing signal;

the resetting module is connected to the output end of the source follower and an input end of the output module, and configured to be turned on when a second control signal is valid and reset the output end of the source follower and the input end of the output module to be at a first level;

the acquisition module is connected to the input end and the operating voltage input end of the source follower, and configured to be turned on when the second control signal is valid and enable the input end of the source follower to be electrically connected to the operating voltage input end of the source follower; and the first control signal is a valid signal inputted at a first time period, the second control signal is a valid signal inputted at a second time period subsequent to the first time period, and the third control signal is a valid signal inputted at a third time period subsequent to the second time period.

2. The fingerprint identification circuit according to claim 1, wherein an identical first control signal, an identical second control signal and an identical third control signal are adopted by the fingerprint identification units in an identical row.

3. The fingerprint identification circuit according to claim 2, wherein a control end of the input module of each fingerprint identification unit in an $n^{th}$ row is connected to a control end of the output module of each fingerprint identification unit in an $(n-3)^{th}$ row, and a control end of the acquisition module and a control end of the resetting module of each fingerprint identification unit in the $n^{th}$ row are connected to a control end of the output module of each fingerprint identification unit in an $(n-2)^{th}$ row, where n is a natural number greater than 3.

4. The fingerprint identification circuit according to claim 1, wherein the input module comprises a first transistor, a gate electrode of which, as the control end of the input module, is configured to receive the first control signal, a first electrode of which, as the input end of the input module, is configured to receive the detection signal, and a second electrode of which, as an output end of the input module, is connected to the sensing module.

5. The fingerprint identification circuit according to claim 1, wherein the sensing module comprises a first electrode and a second electrode arranged opposite to the first electrode, the first electrode is connected to the input module and the source follower, and the second electrode is connected to a control signal end and configured to adjust a potential at the input end of the source follower under the control of a control signal from the control signal end, so as to enable the source follower to operate at a saturation region and adjust an intensity of an output signal from the source follower.

6. The fingerprint identification circuit according to claim 1, wherein the acquisition module comprises a second transistor, a gate electrode of which, as the control end of the acquisition module, is configured to receive the second control signal, a first electrode of which is connected to the input end of the source follower, and a second electrode of which is connected to the operating voltage input end of the source follower.

7. The fingerprint identification circuit according to claim 1, wherein the resetting module comprises a third transistor, a gate electrode of which, as the control end of the resetting module, is configured to receive the second control signal, a first electrode of which, as an input end of the resetting module, is connected to a first level signal end, and a second electrode of which, as an output end of the resetting module, is connected to the output end of the source follower.

8. The fingerprint identification circuit according to claim 1, wherein the source follower comprises a fourth transistor, a gate electrode of which, as the input end of the source follower, is connected to the sensing module, a first electrode of which, as the operating voltage input end of the source follower, is connected to the output control module, and a second electrode of which, as the output end of the source follower, is connected to the output module.

9. The fingerprint identification circuit according to claim 1, wherein the output control module comprises a fifth transistor, a gate electrode of which, as a control end of the output control module, is configured to receive the third control signal, a first electrode of which, as an input end of the output control module, is configured to receive a first signal, and a second electrode of which, as an output end of the output control module, is connected to the operating voltage input end of the source follower.

10. The fingerprint identification circuit according to claim 1, wherein the output module comprises a sixth transistor, a gate electrode of which, as the control end of the output module, is configured to receive the third control signal, a first electrode of which, as the input end of the output module, is connected to the output end of the source follower, and a second electrode of which serves as an output end of the output module.

11. The fingerprint identification circuit according to claim 1, wherein the detection signal and the operating voltage for the source follower are each a power source voltage, the first level is a ground level, and the third control signal is a row scanning signal corresponding to a row where the fingerprint identification unit is located.

12. A display device comprising the fingerprint identification circuit according to claim 1.

13. The display device according to claim 12, wherein the fingerprint identification circuit is arranged on an upper glass substrate of the display device.

14. The display device according to claim 12, wherein each fingerprint identification unit of the fingerprint identification circuit is built in a pixel of the display device.

15. The display device according to claim 14, wherein the pixel of display device comprises a driving transistor configured to control the application of a display signal for the pixel, and the transistors of the fingerprint identification circuit are manufactured synchronously with the driving transistor.

16. A method for driving the fingerprint identification circuit according to claim 1, comprising:
- turning on the input module of the fingerprint identification unit, so as to apply a detection signal to the sensing module of the fingerprint identification unit;
- after the application of the detection signal to the sensing module, turning off the input module;
- turning on the resetting module and the acquisition module of the fingerprint identification unit, so as to reset an output end of the source follower of the fingerprint identification unit to be at a first level, and enable an input end of the source follower to be electrically connected to an operating voltage input end of the source follower;
- turning off the resetting module and the acquisition module, and sensing, by the sensing module, a fingerprint and transmitting a sensing signal to the source follower; and
- turning on the output control module and the output module of the fingerprint identification unit, so as to enable the source follower to amplify the sensing signal and output the amplified sensing signal to the output module, and enable the output module to output the amplified sensing signal.

17. The method according to claim 16, wherein subsequent to the turning off the resetting module and the acquisition module and prior to or subsequent to the turning on the output control module and the output module, the method further comprises adjusting a potential at the input end of the source follower under the control of a control signal from a second electrode of the sensing module, so as to enable the source follower to operate at a saturation region and adjust an intensity of an output signal from the source follower.

18. The method according to claim 16, wherein the input end and the operating voltage input end of the source follower are electrically connected to each other, so as to enable the potential at the input end of the source follower to be equal to a sum of the first level and a threshold voltage of the source follower, and enable the potential at the input end of the source follower to contain information about the threshold voltage of the source follower, thereby to enable the output signal to be irrelevant to the threshold voltage of the source follower.

* * * * *